United States Patent
Hung (10) Patent No.: US 9,445,479 B2
(45) Date of Patent: Sep. 13, 2016

(54) DIMMING CONTROL METHOD AND APPARATUS AND DIMMING SYSTEM

(71) Applicant: Schneider Electric (Australia) Pty Ltd., Macquarie Park (AU)

(72) Inventor: Lau Kwok Hung, Shenzhen (CN)

(73) Assignee: SCHNEIDER ELECTRIC (AUSTRALIA) PTY LTD., Macquarie Park (AU)

(*) Notice: Subject to any disclaimer, the term of this patent is extended or adjusted under 35 U.S.C. 154(b) by 245 days.

(21) Appl. No.: 14/135,272

(22) Filed: Dec. 19, 2013

(65) Prior Publication Data
US 2014/0176013 A1 Jun. 26, 2014

(30) Foreign Application Priority Data

Dec. 21, 2012 (CN) .......................... 2012 1 0560841

(51) Int. Cl.
*G05F 1/00* (2006.01)
*H05B 37/02* (2006.01)
*H05B 33/08* (2006.01)

(52) U.S. Cl.
CPC .......... *H05B 37/02* (2013.01); *H05B 33/0815* (2013.01); *Y02B 20/346* (2013.01)

(58) Field of Classification Search
CPC ..................................................... H05B 37/02
USPC ............... 315/291–311, 185 R, 186–193
See application file for complete search history.

(56) References Cited

U.S. PATENT DOCUMENTS

| 2011/0266974 A1 | 11/2011 | Thornton et al. |
| 2011/0291583 A1 | 12/2011 | Shen |
| 2012/0126714 A1* | 5/2012 | Deppe ................ H05B 33/0815 315/192 |

FOREIGN PATENT DOCUMENTS

| WO | 2008029108 A1 | 3/2008 |
| WO | 2010150183 A1 | 12/2010 |
| WO | 2011013060 A2 | 2/2011 |
| WO | 2012031901 A2 | 3/2012 |

OTHER PUBLICATIONS

EPO Search Report for European Application No. 13198525.1, dated Mar. 13, 2014.

* cited by examiner

*Primary Examiner* — Lincoln Donovan
*Assistant Examiner* — Thomas Skibinski
(74) *Attorney, Agent, or Firm* — Patterson & Sheridan, L.L.P.

(57) ABSTRACT

Embodiments of the present invention disclose a dimming control method and apparatus and a dimming system. The method according to an embodiment of the invention includes: detecting a conduction angle of a dimming apparatus according to an output signal; and controlling a first shunt load according to the conduction angle to disconnect the first shunt load upon detecting a valid conduction angle of the dimming apparatus and to keep the first shunt load conducted upon detecting no valid conduction angle of the dimming apparatus, thereby lowering power consumption.

11 Claims, 5 Drawing Sheets

DIMMING CONTROL METHOD AND APPARATUS AND DIMMING SYSTEM

FIELD OF THE INVENTION

The present invention relates to the field of electromechanical technologies and in particular to a dimming control method and apparatus and a dimming system.

BACKGROUND OF THE INVENTION

At present a lighting load can be controlled by a phase-cutting dimmer or switch, where supply current of the dimmer or the switch flowing through the load may result in the lighting load flickering or failing to be disconnected, which can be addressed by an additional bypass load. The bypass load of the dimmer or the switch which is a virtual load can have the supply current flowing through the lighting load lowered to enable the dimmer or the switch to operate normally when the load is absent or very low.

In the prior art, the bypass load operates primarily with some simple element, for example, the bypass load is embodied simply as a capacitor or a powerful resistor. The inventors of the invention have identified from a research on the prior art that if the bypass load is composed of a resistor, then the lighting load may suffer from increased power consumption, lowered compatibility and a larger amount of generated heat; and if the bypass load is composed of a capacitor, then the capacitor may have an impedance characteristic of the lighting load altered and may result in the lighting load flickering or failing to be disconnected and in a narrowed dimming range of a dimmable lamp.

SUMMARY OF THE INVENTION

Embodiments of the invention provide a dimming control method and apparatus and a dimming system so as to lower power consumption.

A dimming control method includes: detecting a conduction angle of a dimming apparatus according to an output signal; and controlling a first shunt load according to the conduction angle to disconnect the first shunt load upon detecting a valid conduction angle of the dimming apparatus and to keep the first shunt load conducted upon detecting no valid conduction angle of the dimming apparatus.

Optionally a second shunt load is connected in parallel with the first shunt load, and the second shunt load is kept conducted.

Optionally preset current of the first shunt load is far above that of the second shunt load.

Optionally the first shunt load and the second shunt load are low impedance loads or constant current sources.

Optionally if the dimming apparatus is in a low impedance status, then there is a valid conduction angle of the dimming apparatus; and if the dimming apparatus is in a high impedance status, then there is no valid conduction angle of the dimming apparatus.

Optionally the detecting a conduction angle of a dimming apparatus according to an output signal includes: conducting the first shunt load; obtaining the output signal; and detecting a valid conduction angle of the dimming apparatus according to the output signal.

Optionally the dimming apparatus is a dimmer or a switch.

A control apparatus includes: a first shunt load, a detector and a controller, wherein the first shunt load is configured to operate in a conducted status for maintaining normal operation and a disconnected status for lowering power consumption; the detector is configured to obtain an output signal and to detect a conduction angle of a dimming apparatus according to the output signal; and the controller is configured to control the first shunt load according to the conduction angle detected by the detector so that the controller controls the first shunt load to be disconnected when the detector detects a valid conduction angle of the dimming apparatus; and the controller keeps the first shunt load conducted when the detector detects no valid conduction angle of the dimming apparatus.

Optionally the control apparatus further includes a second shunt load, wherein the second shunt load is connected in parallel with the first shunt load, and the second shunt load is kept conducted; and preset current of the first shunt load is far above that of the second shunt load.

Optionally the first shunt load and the second shunt load are low impedance loads or constant current sources.

Optionally the dimming apparatus is a dimmer or a switch.

A dimming system includes a dimming apparatus and any control apparatus described above, wherein the dimming apparatus is configured to perform dimming and to output a conduction angle; and the control apparatus is configured to detect a conduction angle of the dimming apparatus to control the first shunt load disconnected upon detecting a valid conduction angle of the dimming apparatus and to keep the first shunt load conducted upon detecting no valid conduction angle of the dimming apparatus.

Optionally the dimming system further includes a lighting load with which the control apparatus is connected.

As can be apparent from the foregoing technical solutions, the embodiments of the invention have the following advantages:

The invention detects the conduction angle of the dimming apparatus according to the output signal, and disconnects the first shunt load upon detecting a valid conduction angle of the dimming apparatus and keeps the first shunt load conducted upon detecting no valid conduction angle of the dimming apparatus. This embodiment can detect whether there is a valid conduction angle of the dimming apparatus and can disconnect the first shunt load when there is a valid conduction angle of the dimming apparatus to thereby lower power consumption.

BRIEF DESCRIPTION OF THE DRAWINGS

In order to make the technical solutions in the embodiments of the invention more apparent, the drawings to be used in the description of the embodiments will be described briefly, and obviously the drawings in the following description are illustrative of only some embodiments of the invention, and those ordinarily skilled in the art can derive from these drawings other drawings without any inventive effort. In the drawings.

DETAILED DESCRIPTION OF THE INVENTION

The technical solutions in the embodiments of the invention will be described below clearly and fully with reference to the drawings in the embodiments of the invention, and apparently the described embodiments are only a part but not all of the embodiments of the invention. Based upon the embodiments of the invention, all the other embodiments derived by those ordinarily skilled in the art without any inventive effort shall come into the scope of the invention.

An embodiment of the invention provides a dimming control method so as to lower power consumption. Embodiments of the invention further provide a corresponding control apparatus and a dimming system. They will be described below in details respectively.

First Embodiment

An embodiment of the invention provides a dimming control method which will be described from the view of a control apparatus for a convenient description, where the control apparatus can be a load of a dimming apparatus or can be a bypass load of a dimming apparatus, which is connected in parallel with a lighting load in a dimming system.

A dimming control method includes: detecting a conduction angle of a dimming apparatus according to an output signal; and controlling a first shunt load according to the conduction angle to disconnect the first shunt load upon detecting a valid conduction angle of the dimming apparatus and to keep the first shunt load conducted upon detecting no valid conduction angle of the dimming apparatus.

Figure 1:
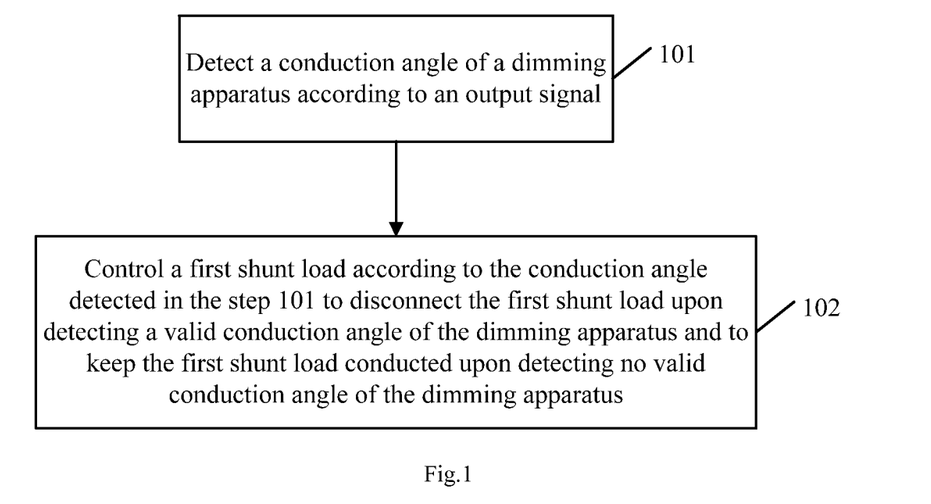
FIG. 1 is a flow chart of a dimming control method in a first embodiment.

Referring to FIG. 1, a particular flow thereof can be as follows:

101. A control apparatus detects a conduction angle of a dimming apparatus according to an output signal;

The dimming apparatus can be a dimmer or a switch for controlling a dimming system. For example, if the dimming system is a lighting system, then the dimming apparatus can control lighting to be switched on/off or bright/dark.

Whether there is a valid conduction angle output from the dimming apparatus can be detected from the output signal of the dimming apparatus.

Optionally if the dimming apparatus is in a low impedance status, then there is a valid conduction angle of the dimming apparatus, and if the dimming apparatus is in a high impedance status, then there is no valid conduction angle of the dimming apparatus.

Optionally the conduction angle of the dimming apparatus can be detected particularly in the steps of: firstly conducting a first shunt load, and then obtaining the output signal, and next detecting the conduction angle of the dimming apparatus according to the output signal.

102. The control apparatus controls a first shunt load according to the conduction angle detected in the step 101 to disconnect the first shunt load upon detecting a valid conduction angle of the dimming apparatus and to keep the first shunt load conducted upon detecting no valid conduction angle of the dimming apparatus.

In order to keep normal operation of the dimming system, a second shunt load can be connected in parallel with the first shunt load, and the second shunt load can be kept conducted, so that the second shunt load can shunt when the first shunt load is disconnected to thereby keep normal operation.

Optionally in order to ensure the conduction angle of the dimming apparatus to be detected, preset current of the first shunt load is typically far above that of the second shunt load.

As can be apparent from the foregoing disclosure, the invention detects the conduction angle of the dimming apparatus according to the output signal and controls the first shunt load according to the conduction angle to disconnect the first shunt load upon detecting a valid conduction angle of the dimming apparatus, thereby lowering power consumption, and to keep the first shunt load conducted upon detecting no valid conduction angle of the dimming apparatus, thereby maintaining normal operation without increasing power consumption. This embodiment can detect whether there is a valid conduction angle of the dimming apparatus and can control the status of the first shunt load according to the status of the valid conduction angle of the dimming apparatus to thereby ensure an impedance characteristic of the load to be invariant.

Second Embodiment

Figure 2:
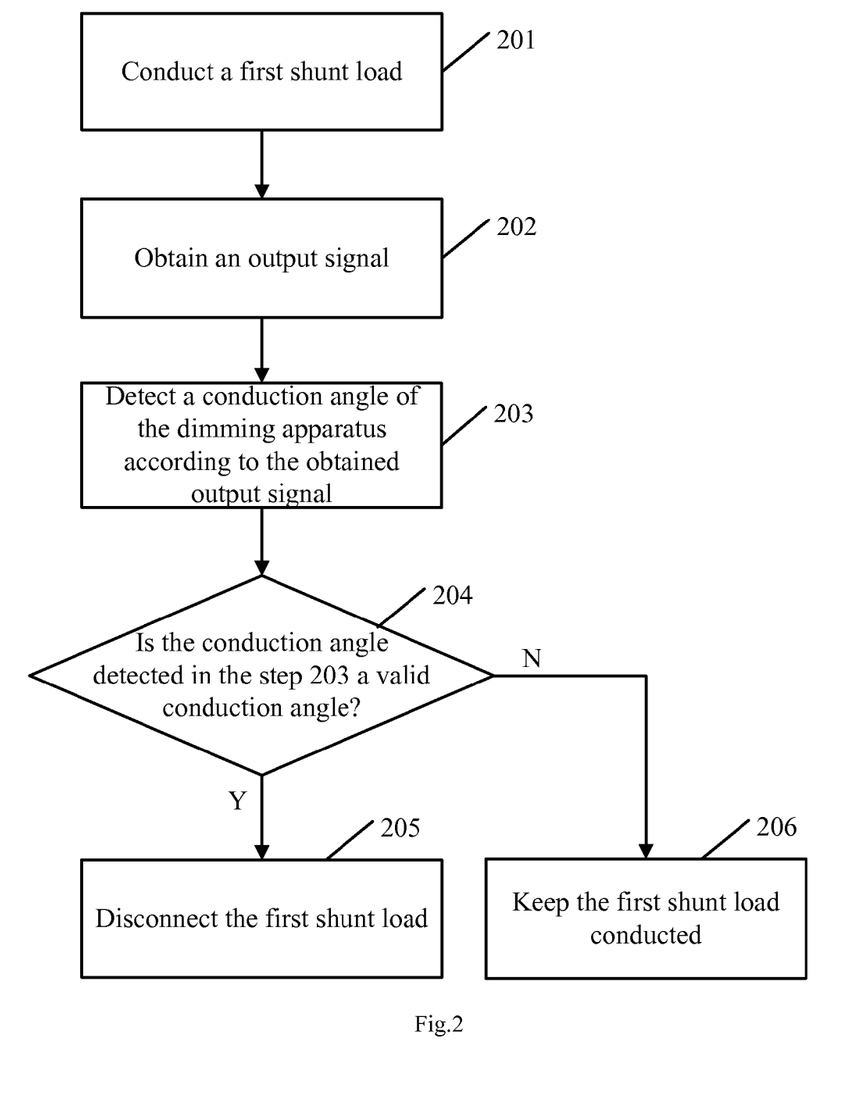
FIG. 2 is a flow chart of a dimming control method in a second embodiment.

For better understanding of the foregoing solution, the technical solution of the invention will be described below in details in a particular embodiments, and reference can be made to FIG. 2 for a particular flow thereof:

201. A first shunt load is conducted.

202. An output signal is obtained;

In the step 201, the first shunt load is conducted, and at this time the circuitry of a dimming system is in a fully closed status, and a dimming apparatus can be controlled differently to output a different signal, so that the status of the dimming apparatus can be detected by obtaining the output signal of the dimming apparatus. For example, the output signal can be obtained in a high impedance status or a low impedance status.

203. A conduction angle of the dimming apparatus is detected according to the obtained output signal.

The dimming apparatus may generate a conduction angle in the course of controlling the dimming system, but the output conduction angle may be valid conduction angle or may be an invalid conduction angle. Whether the dimming apparatus outputs a valid conduction angle or an invalid conduction angle can be detected from the output signal obtained in the step 202, where if the dimming apparatus is in a low impedance status, then there is a valid conduction angle of the dimming apparatus, and if the dimming apparatus is in a high impedance status, then there is no valid conduction angle of the dimming apparatus.

Figure 3:
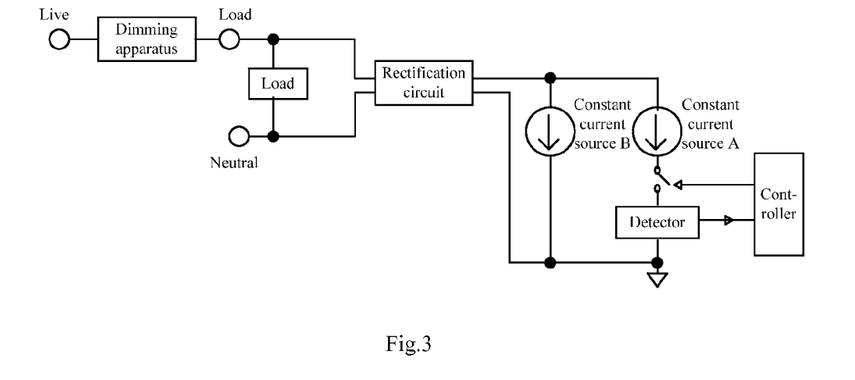
FIG. 3 is a schematic diagram of a dimming system in an embodiment of the invention.

How to detect a conduction angle of the dimming apparatus will be described below in details by way of an example in which the dimming apparatus is a dimmer, and the first shunt load and a second shunt load are constant current sources, where the first shunt load is described as a constant current source A, and the second shunt load is described as a constant current source B for a convenient description, and reference can be made to FIG. 3 and FIG. 5:

Where in this embodiment, CA represents a conduction angle signal of the dimmer, and the conduction angle signal CA output from the dimmer can be detected from an output signal OUT of the dimmer, a valid conduction angle is determined from the conduction angle signal CA, and the constant current source A can be controlled by the control signal CS to be switched on/off according to a detection result of the output signal.

When an output signal OUT is found, at this time the constant current source A is kept switched on to thereby firstly have a valid conduction angle signal of the dimmer determined A timer is triggered by a falling edge of the valid conduction angle signal to serve as a trigger signal to switch again on the constant current source A next time. It shall be noted that if the controller finds a loss of the conduction angle signal, that is, finds that the conduction angle is not a valid conduction angle, then a counting period of time of the timer will be shortened until a valid conduction phase signal is found again, where the counting period of time of the timer is resumed to the original period of time.

Figure 5:
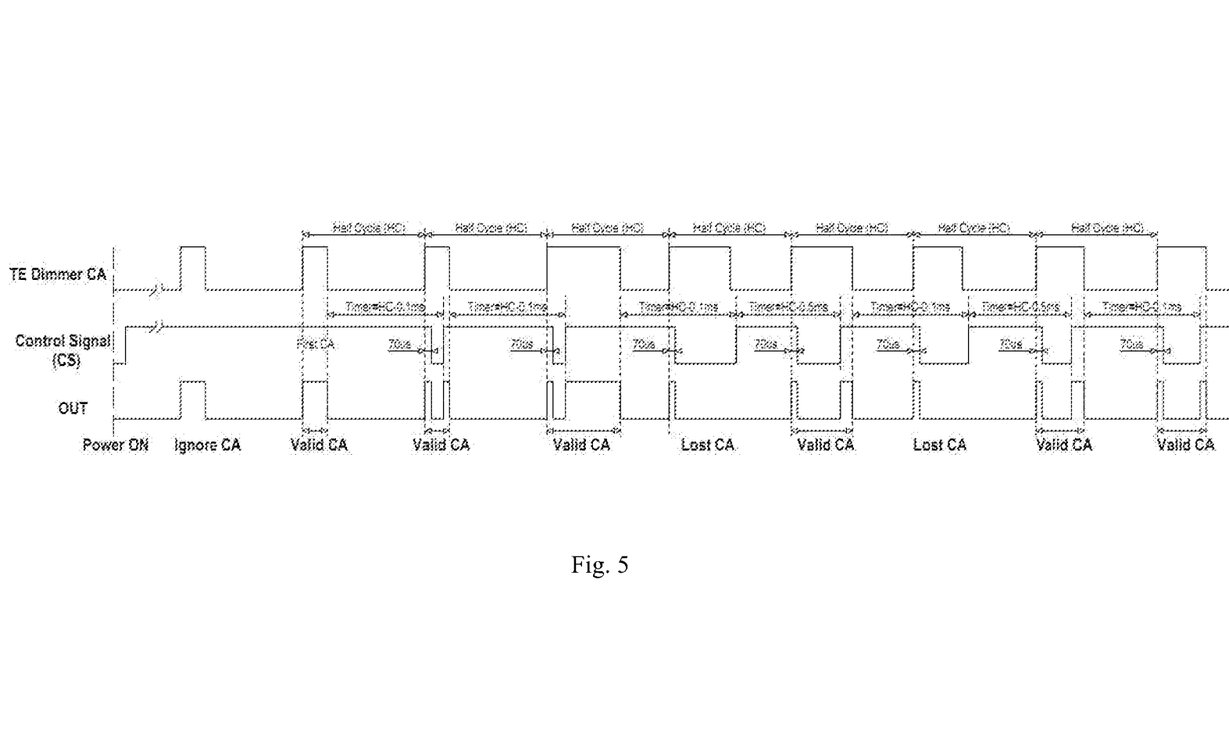
FIG. 5 is a timing diagram of a dimming control method in an embodiment of the invention.

Particularly referring to FIG. 5 which is a timing diagram of controlling the first shunt load to be conducted/disconnected, firstly a power source of the dimming system is switched on, and the constant current source A is switched on, and at this time the control signal CS is output at a high level to thereby look for a first valid conduction angle, where a period of time from a rising edge to a falling edge of the output signal OUT is a valid conduction angle. It shall be appreciated that all the parameters in FIG. 5 are intended to illustrate an operating principle for reference.

Then after the first valid conduction angle is determined, the control signal CS is maintained, and the output signal OUT is observed, and then a next timed output of the control signal is determined according to periodicity information of utility power and the valid conduction angle signal, where after the first valid conduction angle signal is found, the control signal continues with its output at a high level until the output signal OUT is output again at a high level and the constant current source A is switched off.

Where in order to ensure the output signal OUT not to be output again at a high level due to noise or the like, a period of time for waiting is necessary, for example, there is a short period of time for waiting (e.g., 70 µs) after the output signal OUT is output again at a high level, and at this time the control signal CS is output at a low level, and the timer is started. When the counting period of time of the timer expires, the control signal CS will be output again at a high level, where the counting period of time of the timer can be determined as half a cycle, that is, the control signal CS will be output again at a high level upon counting to half a cycle from a falling edge of a last valid conduction angle.

It shall be noted that in order to ensure the stability of a detection signal and the accuracy of counting by the timer, the counting period of time of the timer can be determined as half a cycle minus a specific period of time (e.g., 0.1 ms), where it can also be detected from the control signal CS when the output signal OUT is changed to a low level, and a period of time from a rising edge of last output signal OUT to this falling edge is a valid conduction angle. This can be repeated to detect a conduction angle signal periodically.

Where if the control signal CS is output at a high level when the counting period of time thereof expires while no output signal OUT is found at a high level, then it indicates a loss of the current conduction angle signal, and as illustrated in the middle of FIG. 5, the timer will start to count again when the last counting period of time expires, and in order to ensure a margin of the timer, the counting period of time can be shortened rapidly, for example, the counting period of time can be shortened to half a cycle minus a specific period of time (e.g., 0.5 ms). After the counting period of time is reset, if a valid conduction angle can be found again, then the counting period of time of the timer will be resumed to the original value, that is, the counting period of time is resumed to half a cycle minus a specific period of time (e.g., 1 ms), and if still no valid conduction angle is found, then a next counting period of time is further shortened, for example, the counting period of time can be shortened to half a cycle minus a specific period of time (e.g., 1 ms) until a valid conduction angle is found.

204. It is judged whether the conduction angle detected in the step 203 is a valid conduction angle.

Figure 4:
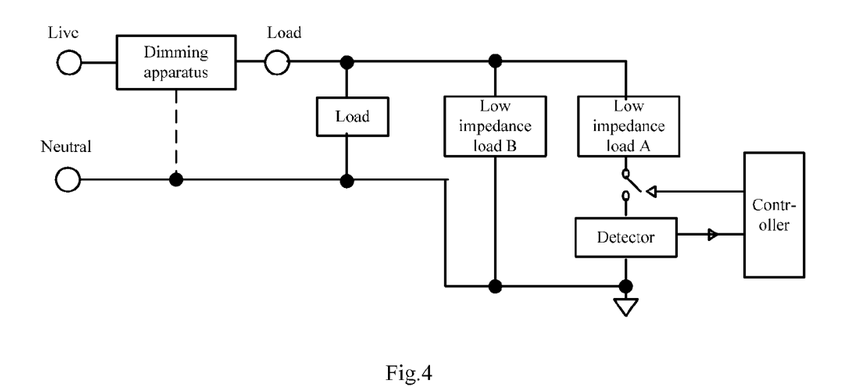
FIG. 4 is another schematic diagram of a dimming system in an embodiment of the invention.

The flow proceeds to the step 205 upon detecting a valid conduction angle of the dimming apparatus; and the flow proceeds to the step 206 upon detecting no valid conduction angle of the dimming apparatus.

Where this embodiment can have a second shunt load connected in parallel with the first shunt load, and the second shunt load can be kept conducted, so that when the first shunt load is disconnected, the second shunt load in this embodiment can shunt to thereby keep normal operation of the dimming system. Particularly referring to FIG. 3 or FIG. 4, the first shunt load in FIG. 3 is a constant current source A, and the second shunt load is a constant current source B, and the first shunt load in FIG. 4 is a low impedance load A, and the second shunt load is a high impedance load B.

Optionally in order to ensure accurate detection of the conduction angle of the dimming apparatus, preset current of the first shunt load is typically far above that of the second shunt load.

Where the first shunt load and the second shunt load can be low impedance loads or constant current sources. Referring to FIG. 3 or FIG. 4, FIG. 3 is a schematic diagram of an example in which the first shunt load and the second shunt load are constant current sources, and FIG. 4 is a schematic diagram of an example in which the first shunt load and the second shunt load are low impedance loads.

205. The first shunt load is disconnected upon detecting a valid conduction angle of the dimming apparatus;

Referring to FIG. 5, the first shunt load is disconnected upon detecting a valid conduction angle of the dimming apparatus, but there is a small overlap zone of the control signal and the conduction angle in this embodiment, that is, the constant current source A is actually kept conducted for a short period of time, and thus there is low power consumption of the control apparatus, thereby lowering power consumption.

206. The first shunt load is kept conducted upon detecting no valid conduction angle of the dimming apparatus.

The first shunt load is kept conducted upon detecting no valid conduction angle of the dimming apparatus to thereby keep normal operation without increasing power consumption, and the first shunt load will not be disconnected until next occurrence of a valid conduction angle.

As can be apparent from the foregoing disclosure, the invention detects the conduction angle of the dimming apparatus according to the output signal and controls the first shunt load according to the conduction angle to disconnect the first shunt load upon detecting a valid conduction angle of the dimming apparatus, thereby lowering power consumption, and to keep the first shunt load conducted upon detecting no valid conduction angle of the dimming apparatus, thereby maintaining normal operation without increasing power consumption. This embodiment can detect whether there is a valid conduction angle of the dimming apparatus and can control the status of the first shunt load according to the status of the valid conduction angle of the dimming apparatus to thereby ensure an impedance characteristic of the load to be invariant.

Third Embodiment

Figure 6:
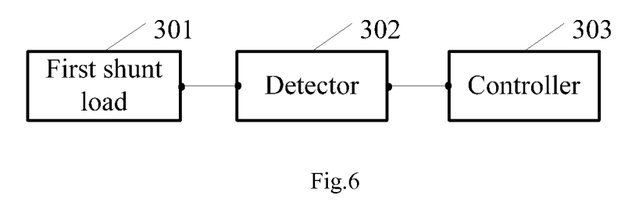
FIG. 6 is a structural diagram of a control apparatus in a third embodiment.

For a better implementation of the foregoing embodiments, an embodiment of the invention further provides a control apparatus. Referring to FIG. 6, this embodiment can particularly include a first shunt load 301, a detector 302 and a controller 303.

The first shunt load 301 is configured to operate in a conducted status for maintaining normal operation and a disconnected status for lowering power consumption.

The detector 302 is configured to obtain an output signal and to detect a conduction angle of a dimming apparatus according to the output signal.

The controller 303 is configured to control the first shunt load 301 according to the conduction angle detected by the detector 302 so that the controller 303 controls the first shunt load 301 to be disconnected when the detector 302 detects a valid conduction angle of the dimming apparatus; and the controller 303 keeps the first shunt load 301 conducted when the detector 302 detects no valid conduction angle of the dimming apparatus.

Where the detector 302 can be a current detection circuit or a voltage detection circuit.

Where the dimming apparatus can be a dimmer or a switch for controlling a dimming system. For example, if the dimming system is a lighting system, then the dimming apparatus can control lighting to be switched on/off or bright/dark.

It shall be noted that the control apparatus in this embodiment can used alone as a load of the dimming apparatus or can be used as a bypass load of the dimming apparatus, which is connected in parallel with a lighting load in the dimming system.

Figure 7:
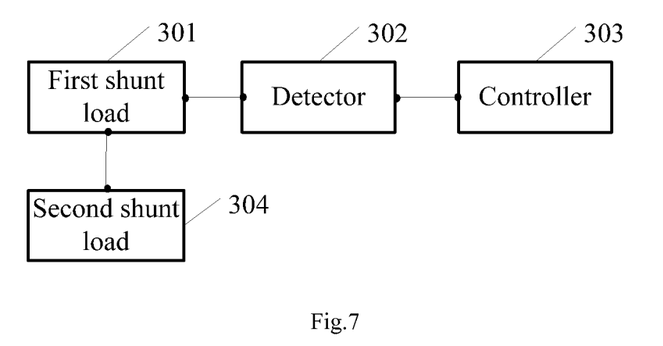
FIG. 7 is another structural diagram of a control apparatus in a third embodiment.

Additionally, referring to FIG. 7, this embodiment can further include a second shunt load 304 connected in parallel with the first shunt load 301, where the second shunt load 304 can be kept conducted, and when the first shunt load 301 is disconnected, the second shunt load 304 can maintain normal operation of the dimming system.

In order to detect validly the conduction angle of the dimming apparatus, preset current of the first shunt load 301 in this embodiment is typically far above that of the second shunt load 304.

The first shunt load 301 and the second shunt load 304 are low impedance loads or constant current sources.

For example, when the second shunt load 304 is a constant current source, and the first shunt load 301 is also a constant current source, in order to ensure the characteristic of the constant current sources, a rectification circuit can be set to rectify supply current of the dimming apparatus.

Where as can be apparent from the foregoing embodiment, if the dimming apparatus is in a low impedance status, there is a valid conduction angle of the dimming apparatus, and if the dimming apparatus is in a high impedance status, then there is no valid conduction angle of the dimming apparatus. That is, when the dimming apparatus is in a low impedance status, the first shunt load 301 is disconnected so that this embodiment can have power consumption lowered at low impedance without influencing the impedance characteristic of the dimming system.

It shall be noted that reference can be made to the foregoing embodiment for a particular implementation, so a repeated description thereof will be omitted here.

As can be apparent from the foregoing disclosure, in the present invention, the detector 302 obtains the output signal and detects the conduction angle of the dimming apparatus according to the output signal, the controller 303 controls the first shunt load 301 according to the conduction angle detected by the detector 302 so that the controller 303 controls the first shunt load 301 to be disconnected when the detector 302 detects a valid conduction angle of the dimming apparatus, thereby lowering power consumption; and the controller 303 keeps the first shunt load conducted when the detector 302 detects no valid conduction angle of the dimming apparatus, thereby maintaining normal operation without increasing power consumption. In this embodiment, the controller 303 can control the status of the first shunt load according to the status of the dimming apparatus to thereby ensure an impedance characteristic of the load to be invariant.

Fourth Embodiment

Figure 8:
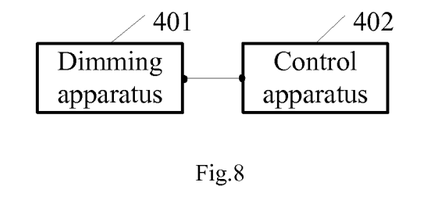
FIG. 8 is a structural diagram of a dimming system in a fourth embodiment.

The invention further provides a dimming system. Referring to FIG. 8, this embodiment can particularly include a dimming apparatus 401 and a control apparatus 402.

Where the dimming apparatus 401 in this embodiment can perform dimming and output a conduction angle. The dimming apparatus 401 can be a dimmer or a switch for controlling a dimming system. For example, if the dimming system is a lighting system, then the dimming apparatus 401 can control lighting to be switched on/off or bright/dark.

Where the control apparatus 402 in this embodiment can particularly include a first shunt load, a detector and a controller. Particularly the first shunt load is configured to operate in a conducted status for maintaining normal operation of the dimming system and a disconnected status for lowering power consumption of the dimming system; the detector is configured to obtain an output signal and to detect a conduction angle of the dimming apparatus 401 according to the output signal; the controller is configured to control the first shunt load according to the conduction angle detected by the detector so that the controller controls the first shunt load to be disconnected when the detector detects a valid conduction angle of the dimming apparatus 401; and the controller keeps the first shunt load conducted when the detector detects no valid conduction angle of the dimming apparatus 401. It shall be noted that reference can be made to the foregoing embodiment for a particular implementation of the control apparatus 402, so a repeated description thereof will be omitted here.

Where the control apparatus 402 in this embodiment can used alone as a load of the dimming apparatus 401 or can be used as a bypass load of the dimming apparatus 401, which is connected in parallel with a lighting load in the dimming system.

Optionally this embodiment can further include a lighting load with which the control apparatus 402 is connected in parallel for use as a bypass load of the dimming apparatus 401.

As can be apparent, the control apparatus 402 can control the first shunt load according to the status of the dimming apparatus 401 to thereby lower power consumption at low impedance and ensure an impedance characteristic of the load to be invariant.

The dimming control method and apparatus and the dimming system according to the invention have been described above in details, and the principle and the embodiments of the invention have been set forth in this context by way of particular examples, but the foregoing description of the invention is merely intended to facilitate understanding of the inventive method and the essence thereof; and also those ordinarily skilled in the art can modify the particular embodiments and the application scope in light of the idea of the invention. In summary the disclosure of the specification shall not be construed as limiting the scope of the invention.

What is claimed is:

1. A dimming control method, comprising:
    conducting a first shunt load;
    obtaining an output signal of a dimming apparatus;
    detecting a conduction angle of the dimming apparatus according to the output signal; and
    controlling the first shunt load by a control signal according to the conduction angle to disconnect the first shunt load upon detecting that the dimming apparatus is in a low impedance status that is, there is a valid conduction angle of the dimming apparatus, and to keep the first shunt load conducted upon detecting that the dimming apparatus is in a high impedance status, that is there is no valid conduction angle of the dimming apparatus,
    wherein there is a small overlap zone of the control signal and the conduction angle, thereby the first shunt load is kept conducted for a short period of time.

2. The method according to claim 1, further comprising:
    connecting a second shunt load in parallel with the first shunt load, wherein the second shunt load is kept conducted.

3. The method according to claim 2, wherein:
    a preset current of the first shunt load is far above that of the second shunt load.

4. The method according to claim 2, wherein:
    the first shunt load and the second shunt load are low impedance loads or constant current sources.

5. The method according to claim 1, wherein:
    the dimming apparatus is a dimmer or a switch.

6. A control apparatus, comprising a first shunt load, a detector and a controller, wherein:
    the first shunt load is configured to operate in a conducted status for maintaining normal operation and a disconnected status for lowering power consumption;
    the detector is configured to obtain an output signal of a dimming apparatus and to detect a conduction angle of the dimming apparatus according to the output signal; and
    the controller is configured to control the first shunt load by a control signal according to the conduction angle detected by the detector so that the controller controls the first shunt load to be disconnected when the detector detects that the dimming apparatus is in a low impedance status, that is, there is a valid conduction angle of the dimming apparatus; and the controller keeps the first shunt load conducted when the detector detects that the dimming apparatus is in a high impedance status, that is, there is no valid conduction angle of the dimming apparatus,
    wherein there is a small overlap zone of the control signal and the conduction angle, thereby the first shunt load is kept conducted for a short period of time.

7. The apparatus according to claim 6, further comprising a second shunt load, wherein:
    the second shunt load is connected in parallel with the first shunt load, and the second shunt load is kept conducted; and
    preset current of the first shunt load is far above that of the second shunt load.

8. The apparatus according to claim 7, wherein:
    the first shunt load and the second shunt load are low impedance loads or constant current sources.

9. The apparatus according to claim 6, wherein:
    the dimming apparatus is a dimmer or a switch.

10. A dimming system, comprising:
    the dimming apparatus and the control apparatus according to claim 6, wherein:
    the dimming apparatus is configured to perform dimming and to output a conduction angle; and
    the control apparatus is configured to detect the conduction angle of the dimming apparatus to control the first shunt load disconnected upon detecting a valid conduction angle of the dimming apparatus and to keep the first shunt load conducted upon detecting no valid conduction angle of the dimming apparatus.

11. The dimming system according to claim 10, further comprising a lighting load with which the control apparatus is connected in parallel.

* * * * *